United States Patent [19]

Brown et al.

[11] Patent Number: 5,627,959
[45] Date of Patent: May 6, 1997

[54] METHOD FOR MANIPULATING GRAPHIC OBJECTS

[75] Inventors: Bruce Brown, Hak Moon Bay; Ivan Chong, San Mateo; Ernest Wong, San Jose; James Rhee, Mt. View, all of Calif.

[73] Assignee: Oracle Corporation, Redwood Shores, Calif.

[21] Appl. No.: 579,471

[22] Filed: Dec. 27, 1995

Related U.S. Application Data

[63] Continuation of Ser. No. 124,982, Sep. 20, 1993, abandoned.

[51] Int. Cl.$^6$ .................................................. G06F 3/14
[52] U.S. Cl. ............................................. 395/356; 395/344
[58] Field of Search ............................ 345/113; 395/155, 395/156, 157, 158, 159, 160, 161, 164, 600, 700

[56] References Cited

U.S. PATENT DOCUMENTS

| | | | |
|---|---|---|---|
| 4,813,013 | 3/1989 | Dunn | 364/900 |
| 5,041,992 | 8/1991 | Cunningham et al. | 345/113 |
| 5,121,470 | 6/1992 | Trautman | 395/140 |
| 5,121,477 | 6/1992 | Koopmans | 395/156 |
| 5,146,556 | 9/1992 | Hullot | 395/159 |
| 5,155,806 | 10/1992 | Hoeber | 395/157 |
| 5,157,768 | 10/1992 | Hoeber | 395/157 |
| 5,179,654 | 1/1993 | Richards et al. | 395/157 |
| 5,315,703 | 5/1994 | Matheny et al. | 395/155 |
| 5,317,732 | 5/1994 | Gerlach, Jr. et al. | 395/600 |
| 5,325,533 | 6/1994 | McInerney et al. | 395/700 |

Primary Examiner—Thomas G. Black
Assistant Examiner—Ruay Lian Ho
Attorney, Agent, or Firm—Flieslerm, Dubb, Meyer & Lovejoy

[57] ABSTRACT

The present invention provides the capability to use customized procedures to manipulate and control objects in graphic implementations. It provides externalizes much of the underlying object manipulation functionality. A customized procedure is executed at various "trigger" points including: the expiration of a specified period of time; the opening or closing of a window; or, when input from a mouse input device is received. There are several different types of mouse events: mouse button down; mouse move with button down; mouse move with no button down; and mouse button up. A graphic object associated with a customized procedure that is triggered by a mouse event is called a "button object." The customized procedure associated with a button object has four parameters: buttonobj, hitobj, win, and eventinfo. The buttonobj parameter refers to the graphic object having a button procedure that is currently being executed. The hitobj parameter refers to the graphic object that was selected triggering the mouse event. The present invention provides a tree-like organization for grouping its graphic objects. If the selected object does not have an associated button procedure, the tree-like structure is traversed upward to find an object that does have an associated button procedure. The win parameter identifies the window that the mouse event occurred in. The eventinfo parameter points to a record containing information pertaining to the mouse event that triggered the procedure execution. A customized procedure driven by a mouse event transforms a graphic object into a "button" object.

12 Claims, 10 Drawing Sheets

| FIELD | DATA TYPE |
|---|---|
| event_type | number |
| mouse_position | og-point datatype |
| click_count | number |
| constrained | boolean |

510A — event_type
510B — mouse_position
510C — click_count
510D — constrained
510 eventinfo

METHOD FOR MANIPULATING GRAPHIC OBJECTS

This application is a continuation of Ser. No. 08/124,982, filed Sep. 20, 1993, now abandoned.

BACKGROUND OF THE INVENTION

1. Field of the Invention

This invention relates to the field of manipulating graphic objects.

2. Background Art

Database management systems (DBMS) have been developed to address informational needs by providing tools to define, store and retrieve data. For example, a relational database management system (RDBMS) provides the ability to structure information into relations, or tables, and relating tables using join columns.

Tools to externalize the information contained in a DBMS include forms and report generation tools, for example. Prior art database manipulations using forms and report generation tools were accomplished by invoking procedures that execute steps to manipulate the DBMS information.

For example, a forms tool provides the ability to define an output layout that includes textual fields such as prompt and data fields. A form can display data. Further, a form can provide an ability to modify data by modifying the textual representation of the data and/or specifying operations for modifying data in the DBMS. Procedures associated with a form can provide the ability to manipulate data in a DBMS.

The form and report generation tools are used to communicate information in a textual format. Thus, these tools cannot provide an ability to represent (e.g., display or input) data in graphical form. Further, these tools cannot provide the ability to modify the data by modifying the graphical representation of the data.

Prior art graphical applications can provide basic graphic tools. However, these prior art graphical applications do not provide an ability to manipulate a database using objects in a graphic environment. Prior art manipulation of objects in a graphic environment has required the generation of a library of routines written in a programming language such as C. Further, it has resulted in a set of rules for manipulating objects that are not flexible.

A prior art system, disclosed in U.S. Pat. No. 4,813,013 issued to Robert M. Dunn on Mar. 14, 1989, implements an interactive rule based system to enable problem solutions to be generated in schematic diagram form. The system of Dunn permits a designer to create libraries of functions and icons for use in the problem solving process.

Another prior art method, disclosed in U.S. Pat. No. 5,041,992 issued to Robert E. Cunningham, et al. on Aug. 20, 1991, is an interactive method of developing user manipulable graphic elements. It is a system for generating a graphic interface and then building an application "inward" from the interface.

A further prior art system, disclosed in U.S. Pat. No. 4,121,470 issued to Edwin D. Trautman on Jun. 9, 1992, implements an interactive record system for automatically indexing a set of data obtained from a number of internal and external sources. The system allows data events and data objects to be associated with each other. An index of data objects is generated including marker means for individually marking data events. Actuators can be defined that include means for bounding interactive areas on a display screen that can be activated by touch of a cursor positioning icon.

A prior art method of specifying a user interface for a data base is described in U.S. Pat. No. 5,121,477 issued to Sytze T. Koopmans on Jun. 9, 1992. A panel definition phase displays a pop up window with a plurality of prompts for specifying the form of a subsequent pull down window which becomes part of a panel interface to a specified application program and is available to a run time user. The invention allow run time applications to be customized with graphical interface options.

Still another prior art system, disclosed in U.S. Pat. No. 5,146,556 issued to Jean-Marie Hullot, et al. on Sep. 8, 1992, provides a graphic user interface for a computer in which representations of application programs can be placed in a reserved area so that they will not be overlapped by work windows. The application icons are guided into specific "docks" in the reserved area. Removal of icons from the docking area is limited.

Yet another prior art method of providing display buttons to access context sensitive help information is described in U.S. Pat. Nos. 5,155,806 and 5,157,700 issued to Anthony Hoeber, et al. on Oct. 13, 1992 and Oct. 20, 1992, respectively. The system is intended to be used in a display system having object oriented graphic interfaces. The system teaches the use of windows that include text, icons, and buttons that correspond to functions that are to be executed by the central processing unit. A cursor positioning device is used to activate a button, generating a help description.

Each of the foregoing prior art systems does not provide customized PL/SQL procedures to manipulate and control graphic objects.

SUMMARY OF THE INVENTION

The present invention relates to manipulation of computer databases in a graphics environment. Specifically, the invention provides the capability to use customized procedures to manipulate and control objects in graphic implementations. It provides the ability to manipulate a database using objects in graphic implementations requiring minimal programming effort. It provides a package containing types, constants, procedures, and functions that externalize much of the underlying object manipulation functionality. For example, the functionalities in the present invention include: Graphic Object, Charting, Display, Window, Query, Application, Multimedia, Timer, Printing, and Operating System Related.

The Graphic Object functionality includes routines for creating, cloning, moving, rotating, scaling, destroying, and changing attributes of graphic objects. The Charting functionality includes routines for creating and manipulating various properties of chart objects. The Display functionality includes routines for opening and closing graphic displays. The Window functionality includes routines for hiding, showing, and creating windows that observe specifiable object layers of the main window. The Query functionality includes routines for executing and examining the results of queries. The Application functionality includes routines to set and get various application level properties such as the window system cursor, resolution information, and graphical user interface (GUI) platform information. The Multimedia functionality includes routine to create, import, and export images and sounds as well as to play and record sounds. The Timer functionality includes routines to activate, deactivate, and manipulate properties of timers. The Printing functionality includes routines to print specifiable portions of a display. The operating system related functionality includes routines to perform operating system related tasks such as translating environmental variables, executing operating system commands, and invoking user exits.

The present invention can be used to create customized procedures. When a customized procedure is created, it can be executed at various "trigger" points. The trigger points include: the expiration of a specified period of time (i.e., timer event); the opening or closure of a display; or, the receipt of an event from a mouse input device (i.e., mouse event).

The present invention provides the ability to associate a customized procedure with the opening or closing of a graphical display. When a display is initially opened, the customized procedure (i.e., an open display trigger) is executed. Similarly, a customized procedure associated with a display closure (i.e., a close display trigger) is executed when a display is closed.

Customized procedures can be associated with a timer event. Thus, a customized procedure can be invoked at a specified timer interval. For example, a customized procedure is specified to be invoked every 0.122 seconds. The procedure will be executed 0.122 seconds after the display is opened, 0.244 seconds after the display is opened, etc.

A mouse event is another event that can trigger a customized procedure. There are several different types of mouse events: mouse button down; mouse move with button(s) down; mouse move with no button(s) down; and mouse button up. A graphic object associated with a customized procedure that is triggered by a mouse event is called a "button object."

The customized procedure associated with a button object (i.e., a button procedure) has four parameters: buttonobj, hitobj, win, and eventinfo. The buttonobj parameter refers to the graphic object having a button procedure that is currently being executed. This provides the ability to write generic button procedures that can operate on multiple objects (e.g., a button procedure to color an object red when it is selected with the mouse). The hitobj parameter refers to the graphic object that was selected triggering the mouse event. The present invention provides a tree-like organization for grouping its graphic objects. If the selected object does not have an associated button procedure, the tree-like structure is traversed upward to find an object that does have an associated button procedure. The window in which the mouse event occurred is identified by the win parameter. The eventinfo parameter points to a record containing information pertaining to the mouse event that triggered the procedure execution. The record contains the following information: mouse event type, mouse screen coordinate position, mouse button click count, and constrained information (i.e., was the mouse event accompanied with a constraint key).

Further, the present invention provides the ability to define a bind variable and a lexical reference, and include them in a database query. When the database query containing a bind variable is executed, the current value of the bind variable is substituted in the query. For example, ":deptnumber" bind variable can be included in the query "select ename, salary from emp where deptno=:deptnumber." When the query is executed, the current value of deptnumber is used to determine the "ename" and "salary" values selected from "emp." Bind variables provide additional flexibility in developing queries, and can act as global variables for use in communicating values to multiple procedures. Lexical references are placeholders for text that can be embedded in a SQL SELECT statement. Defining a parameter in a Parameter Table, and placing an ampersand (&) before a parameter makes it a lexical reference. For example, parameter "my_param" can be defined as type CHAR. A generic SQL SELECT statement containing this parameter "my_param" defines a query (i.e., select &my_param). The rest of the SQL statement can be constructed in PL/SQL (it can be customized as needed). Because PL/SQL does not recognize lexical references to parameters, bind references are used to reference a parameter in PL/SQL.

Thus, the present invention provides the capability to manipulate database items using graphic objects. Graphic objects can be manipulated at four different trigger points (i.e., display opening, display closing, timer events, and mouse events). A customized procedure driven by a mouse event transforms a graphic object into a "button" object. The button object can be the selected graphic object with a button procedure, or a graphic object with a button procedure that is a parent to the selected graphic object. Certain information about a mouse event (i.e., event type, mouse position, click count, and constrained information) is retained to facilitate mouse event handling. Binding variables provide the ability to parameterize queries and communicate data values between procedures.

DETAILED DESCRIPTION OF THE INVENTION

Figure 1A:
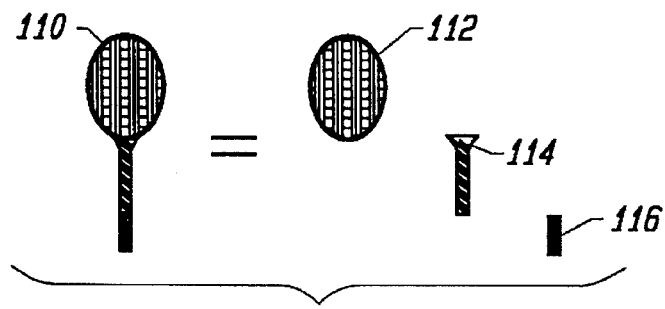
FIGS. 1A–1C are diagrams illustrating grouping of graphical objects according to the present invention.

A method for manipulating database and graphic objects in a database system is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present invention provides the ability to manipulate a database using objects in graphic implementations that requires minimal programming effort. It provides a package containing types, constants, procedures, and functions that externalize the underlying object manipulation functionality. For example, the functionalities in the present invention include: Graphic Object, Charting, Display, Window, Query, Application, Multimedia, Timer, Printing, and Operating System Related.

The Graphic Object functionality includes routines for creating, cloning, moving, rotating, scaling, destroying, and changing attributes of graphic objects. The Charting functionality includes routines for creating and manipulating various properties of chart objects. The Display functionality includes routines for opening and closing graphic displays. The Window functionality includes routines for hiding, showing, and creating windows that observe specifiable object layers of the main window. The Query functionality includes routines for executing and examining the query results. The Application functionality includes routines to set and get various application level properties such as the window system cursor, resolution information, and graphical user interface (GUI) platform information. The Multimedia functionality includes routine to create, import, and export images and sounds as well as to play and record sounds. The Timer functionality includes routines to activate, deactivate, and manipulate properties of timers. The Printing functionality includes routines to print specifiable portions of a display. The operating system related functionality includes routines to perform operating system related tasks such as translating environmental variables, executing operating system commands, and invoking user exits.

Overview

Pointing a mouse at one of the graphic objects and pressing a mouse button generates a mouse down event. The tree is traversed to locate an active object having a first button procedure that is responsive to a mouse down event. When the active object is found, the first button procedure of the active object is put in a button execution history and executed. A layer object is obtained when the mouse does not point to a graphic object. A second button procedure of the layer object is executed when the layer object has a second button procedure that is interested in a mouse down event. Layer objects are handled analogously to regular graphic objects (i.e., they are put into the button execution history, etc.). The procedures include one or more PL/SQL statements. Moving a mouse generates a mouse move event. The mouse event is checked to determine if the mouse button is depressed. When the mouse button is depressed, an active object is extracted from the button execution history. A button procedure of the active object is executed when the button procedure is responsive to a mouse move event. A layer object is obtained when the mouse button is not depressed. A second button procedure of the layer object is executed when the layer object has a second button procedure that is interested in a mouse move event. A mouse up event is generated by releasing a mouse button. The button execution history is checked to determine if it contains at least one graphic object. When the button execution history does contain an object, an active button is extracted from the execution history. A button procedure of the active button is executed when the button procedure is responsive to a mouse up event.

Graphical Objects

Objects are visual components of a graphical display. Objects include arcs, charts, ellipses, imported images, lines, polygons, rectangles, rounded rectangles, freehand shapes, symbols, text, and text fields. Thus, objects are both line-art objects and bit-mapped images. Objects can stand alone as art in a display, or be associated with data, as in a chart. Also, objects can be associated with PL/SQL procedures as buttons. Such objects are clicked on at run time to perform an operation(s). Other display components include queries, chart templates, PL/SQL editor.

Each object contains a name, event type, and procedure. The name of the object is used in PL/SQL programs to reference the object. However, the name is optional. The procedure is the PL/SQL button procedure associated with the object. The procedure is executed when a specified "mouse event" that is related to the object is detected. Event types specify which mouse events invoke the specified button procedure.

Several objects can be grouped together as a single object. Any operation performed on a group object is applied to all of the individual objects that compose it. A group object can be assigned a PL/SQL button procedure that is executed if the user clicks any member of the group. A group object is stored in a group tree. At the top of every group's tree is the root object. It is the topmost object.

FIG. 1A is a diagram illustrating a collection of graphical objects 112–116 that can be grouped together as a tennis racket object 110. The tennis racket object 110 includes an object 112 representing a tennis racket head, another object 114 representing a tennis racket handle, and still another object 116 representing a tennis racket grip. Tennis racket object 110, tennis racket head object 112, tennis racket handle object 114, and tennis racket grip object 116 can each be either line-art objects or bit-mapped images.

A group can comprise other group objects. Thus, the present invention allows multi-level groups that have many levels of group objects. For example, a plurality of single objects and a plurality of groups can be grouped together to form yet another group. The newly formed group is composed of the selected objects, at least one of which objects is composed of a plurality of other objects.

Figure 1B:
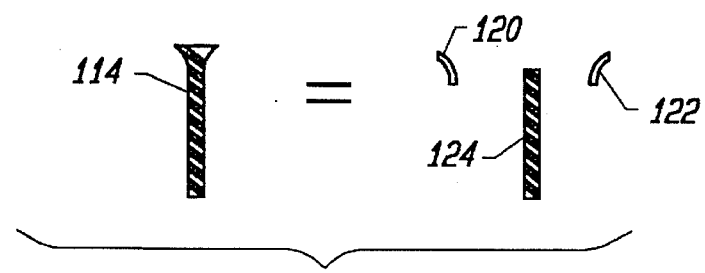

FIG. 1B is a diagram illustrating tennis racket handle object 114 of FIG. 1A. Tennis racket handle object 114 is, in turn, comprised of a plurality of graphical objects 120–124. Objects 120 and 122 are objects representing tennis racket necks. Object 124 is an object representing a tennis racket arm. Tennis racket neck objects 120 and 122 connect tennis racket arm object 124 to tennis racket head object 112 of FIG. 1A. Thus, FIGS. 1A and 1B depict a group of objects 112, 114, and 116 representing a tennis racket object 110 wherein at least one of the objects 114 is itself a group object comprising yet another plurality of objects 120, 122, and 124 grouped together.

The relationship between groups and the objects that compose them is described using a group tree. A group tree is based on the concept of a family tree. Each object belonging to a group is called a child of that group. The group object is called the parent of all of its children. As mentioned above, the present invention represents all objects using a group tree.

Figure 1C:
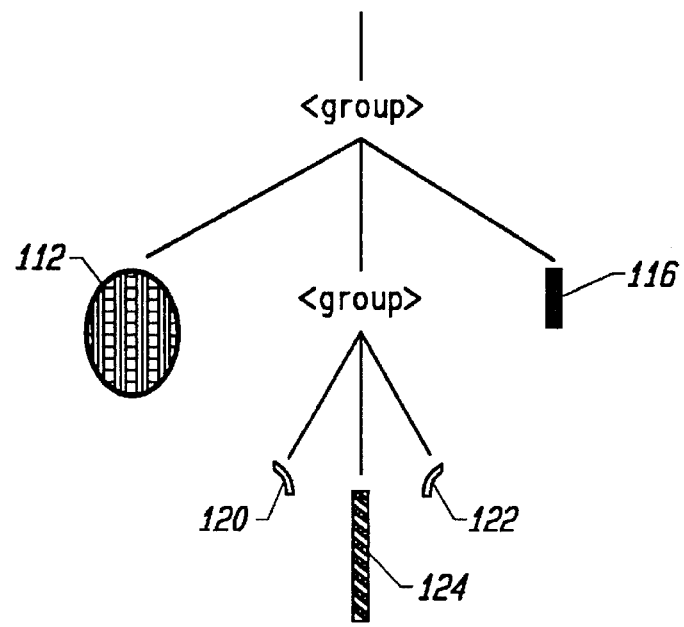

FIG. 1C is a diagram illustrating a group tree for tennis racket object 110 describing the objects and groups of FIGS. 1A and 1B. Tennis racket arm object 124, and tennis racket neck objects 120 and 122 are children of the tennis racket handle group object 114. As shown in the drawing, tennis racket handle group object 114 is itself the child of the tennis racket group object 110. Tennis racket handle object group object 114 is a child of parent 110 that is at the same level as child objects 112 and 116.

Each object or group of objects is identified by a handle. In turn, graphical objects have attributes that are described by attribute records. An attribute is simply a property or characteristic of the graphical object. For example, an attribute of a rectangle object is the foreground fill color.

Further, two attributes of an arc object are the start angle and end angle for instance. Thus, attributes describe the structure and appearance of an object. The present invention provides built-in variable datatypes to control attributes which are defined to be records. Each field of the record represents a particular attribute.

Attributes are classified into three categories: generic, graphic, and object-specific. Generic attributes apply to all objects, and include such items as an object name, an associated button procedure, or a parent object. Graphic attributes apply to many objects but not all. For example, a graphic attribute such as fill color is used to describe a rectangle, arc, symbol, etc. A group object cannot be described by graphic attributes although individual components may be. Object-specific attributes apply only to a specific object type. For example, a start angle is an attribute that describes only an arc, and not a rectangle, line, image, or other object type. Also, the number of children is an attribute specific to the group object. Table 1 lists several object types and each objects associated attribute records.

TABLE 1

| Object Type | Attribute Records |
| --- | --- |
| arc | generic |
|  | graphic |
|  | arc |
| chart | generic |
|  | group |
|  | chart |
| group | generic |
|  | image |
| image | generic |
|  | image |
| line | generic |
|  | graphic |
|  | polygon |
| rectangle | generic |
|  | graphic |
|  | rectangle |
| rounded rectangle | generic |
|  | graphic |
|  | rounded rectangle |
| symbol | generic |
|  | graphic |
|  | symbol |
| text | generic |
|  | graphic |
|  | text |
| window | window |

A layer is a drawing surface that can contain a plurality of objects and grouped objects. Layers are individual surfaces that lie on top of one another. The layout of a display is composed of one or more distinct layers. Thus, a display is divided into overlapping sections (layers) that allow objects to be shown or hidden at different times. The active layer is always showing, and multiple layers can be shown with the active layer. When the display is run, the contents of the layout are shown. The user views the information presented in the display, or interacts with display using a mouse or keyboard. The active layer is the only layer that the user interacts with, but the active layer is specifiable.

Figure 3A:
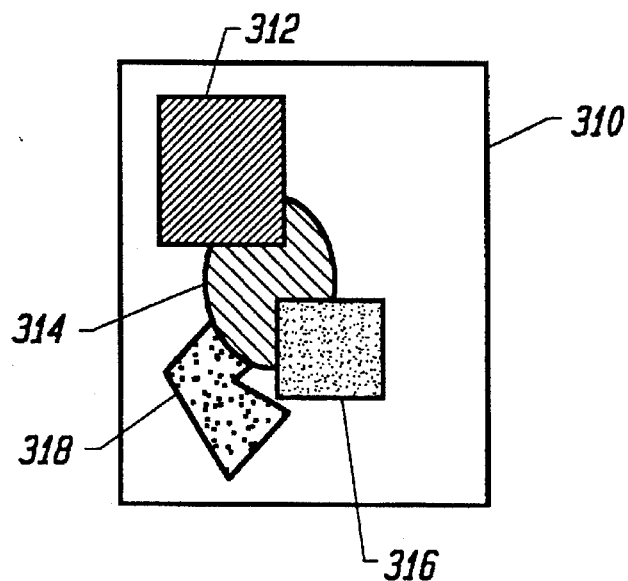
FIGS. 3A and 3B are diagrams illustrating graphical objects on several, different layers.

FIG. 3A is a diagram illustrating objects 312, 314, 316, and 318 contained on a single surface. While the diagram illustrates simple geometrically shaped objects 312, 314, 316, and 318, it should be apparent to a person skilled in the art that the display may contain other graphical objects including charts, ellipses, imported images, rounded rectangles, symbols, text, and text fields. Object 312 is a rectangle object having a gray fill pattern. Object 314 is an oval object having a diagonal hash fill pattern. Object 316 is a rectangle object having a solid, black fill pattern. Object 318 is a polygon object having a dotted fill pattern.

Figure 3B:
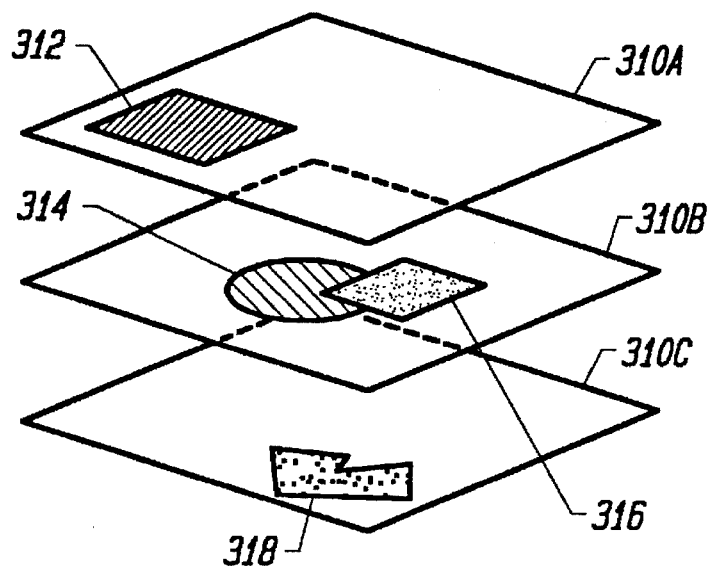

FIG. 3B illustrates that the objects 312, 314, 316, and 318 of layout 310 are located on different layers 310A–310C. Rectangle object 312 with the gray fill pattern is located on layer 310A. Oval object with diagonal hash fill pattern and rectangle object 314 having the solid, black fill pattern are located on layer 310B. Polygon object 318 having the dotted fill pattern is located on layer 310C. The diagram illustrates that the layers 310A, 310B, and 310C are superimposed upon one another, respectively.

Figure 2:
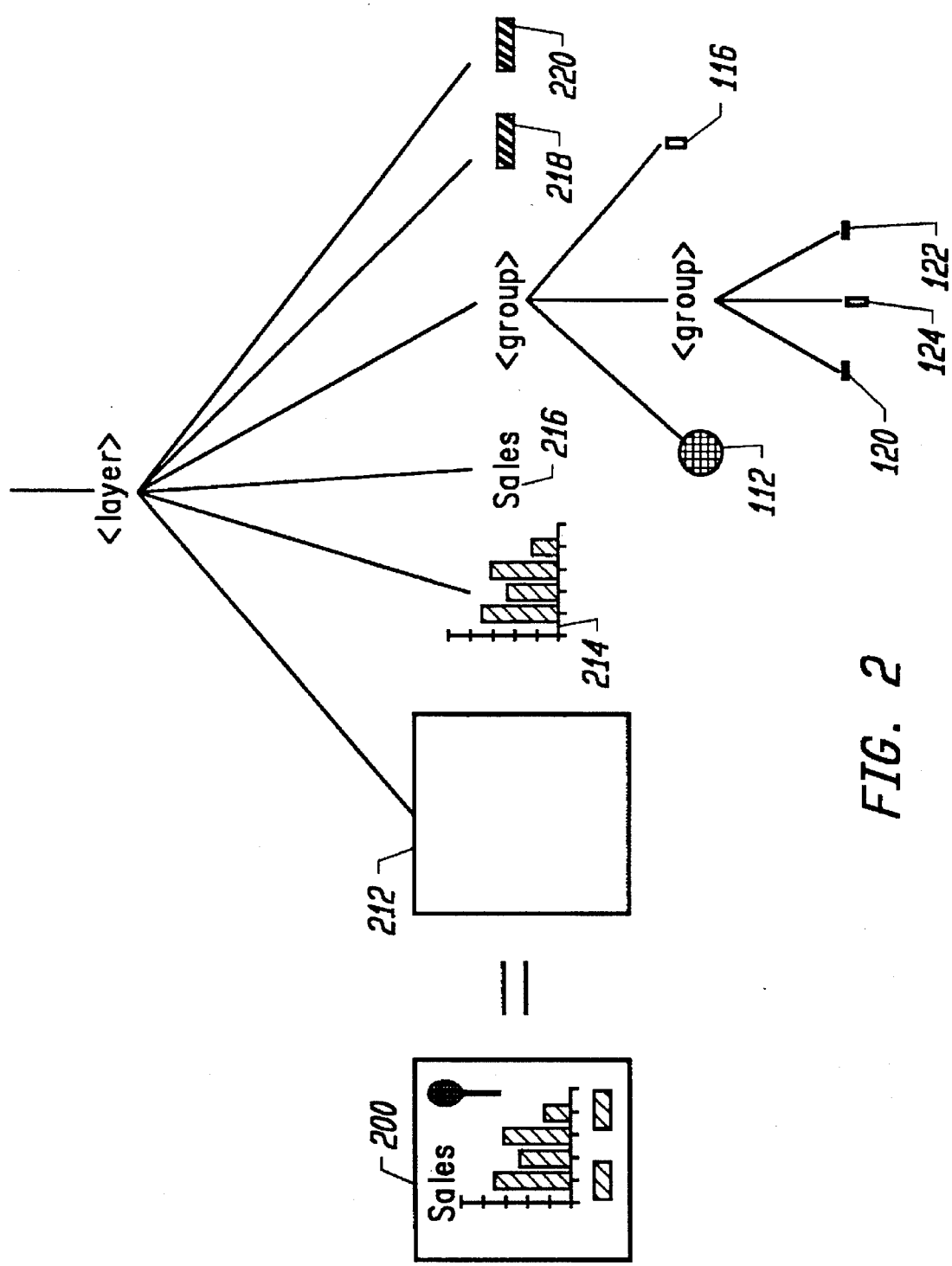
FIG. 2 is a diagram illustrating a layer including groups of graphical objects according to the present invention.

FIG. 2 is a diagram illustrating a layer as a group. The drawing shows the tennis racket 110 of FIG. 1A in a display, along with a rectangle 212, a chart 214, a text object 216, and button objects 218 and 220. Each of the objects resides on the active layer. Thus, FIG. 2 illustrates the group tree for the collection of objects comprising display layout 200.

As shown in FIG. 2, the active layer is also represented in the group tree. A layer is manipulated by PL/SQL procedures as are other group objects. At the top of every object's group tree lies the root object. It is the topmost object in a display. Every other object in the display descends from the root object. Layers are defined as the children of the root object.

Figures 4, 5:
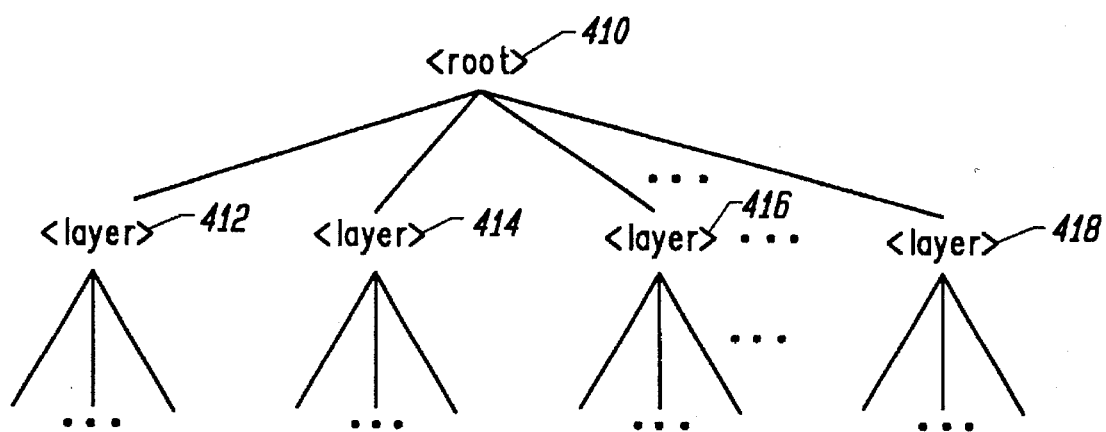
FIG. 4 is a diagram illustrating the root of a group tree according to the present invention.
FIG. 5 is a diagram illustrating an eventinfo argument according to the present invention.

FIG. 4 is a diagram illustrating the root 410 of a group tree comprising a plurality of layers 412, 414, 416, and 418. The root 410 can have one or more child layers. Each layer can comprise a plurality of objects and group objects. For instance, the display layout of FIGS. 3A and 3B are represented by a tree as shown in FIG. 4. For this case, the root 410 has three children where layers 310A, 310B, and 310C of FIG. 3B correspond to layers 412, 414, and 416, respectively.

The order in which objects are placed in a group or layer is meaningful. Each object that is added to a group or layer is drawn on top of the object just before it. In a group tree, the rightmost object in a group is always drawn last. Thus, the rightmost object that shares the same space on the layout as objects to the left is drawn on top of them. For instance, in FIG. 1C, tennis racket grip object 116 is the rightmost object of head object 112, group object 114, and grip object 116. Thus, if it overlaps either of the other two objects in the display layout, it is drawn on top.

PL/SOL Procedures

The present invention is used to create customized procedures. When a customized procedure is created, it is executed at various "trigger" points. The trigger points include: the expiration of a specified period of time such as a timer event; the opening or closure of a display; or when input from a mouse input device is received such as a mouse event.

A mouse event is an event that triggers a customized procedure. There are different types of mouse events: a mouse button down event; a mouse move with button(s) down event; a mouse move with no button(s) down event; and, a mouse button up event. A graphic object associated with a customized procedure that is triggered by a mouse event is called a "button object."

The present invention provides the ability to associate a customized procedure with the opening or closing of a graphical display. When a display is initially opened, the customized procedure (i.e., an open display trigger) is executed. Similarly, a customized procedure associated with a display closure (i.e., a close display trigger) is executed when a display is closed.

Customized procedures can be associated with a timer event. Thus, a customized procedure can be invoked at a specified timer interval. For example, a customized procedure is specified to be invoked every 0.122 seconds. The procedure is executed 0.122 seconds after the display is opened, 0.244 seconds after the display is opened, and so on.

PL/SQL procedures in displays provide programmatic control of certain operations. A procedure is executed to perform a specified sequence of actions. For example, a procedure may update a chart based on new data. Table 2 illustrates the syntax of a procedure. The procedure name is the unique name of procedure. The argument list comprises information passed to the procedure including names of unique local variable, the valid PL/SQL and graphic built-in variable types, and constant values of the specified types. The local declarations defines local information to the procedure defined using a syntax similar to that for the argument list. The statements are executable PL/SQL statements. Exception handlers are statements for trapping or isolating success and failure in PL/SQL procedures. There are two types of exceptions including user-defined and predefined exceptions.

TABLE 2

PROCEDURE procedure_name [argument list] IS
   [local declarations]
BEGIN
   statements
[EXCEPTION
   exception handlers]
END [procedure_name];

Trigger Procedures

A trigger procedure is a procedure that is executed when one of three triggers occurs. The triggers are the opening of a display, closing of a display, or timed interval elapsing. Trigger events are invoked automatically by the timer, opening of a window, or closing a window. Therefore, they do not have any arguments.

Binding Variables With Database Queries

The present invention provides the ability to define a bind variable, and to include it in a database query. When a database query containing a bind variable is executed, the current value of the bind variable is substituted in the query. Thus, bind references are used to replace a single value, such as a character string, number, or date, for example. The bind reference is identified by preceding the variable name with a colon (:). The bind variable is defined in a Parameter Table.

For example, the "deptnumber" bind variable is included in the query "select ename, salary from emp where deptno= :deptnumber." When the query is executed, the current value of deptnumber is used to determine the "ename" and "salary" values selected from "emp." Bind variables provide additional flexibility in developing queries. Further, bind variables can act as global variables for use in communicating values to multiple procedures. Bind variables can be set or retrieved from within a PL/SQL procedure. Table 3 illustrates an example of using a bind variable within a PL/SQL procedure. When procedure foo is called, the :deptnumber bind variable is assigned a value of 20.

TABLE 3 procedure foo is
begin
   :deptnumber := 20;
end;

Defining a parameter in a Parameter Table, and placing an ampersand (&) before a parameter makes it a lexical reference. For example, parameter "my_param" can be defined as type CHAR. A generic SQL SELECT statement containing this parameter "my_param" defines a query (i.e., select &my_param). The rest of the SQL statement can be constructed in PL/SQL (it can be customized as needed). Because PL/SQL does not recognize lexical references to parameters, bind references are used to reference a parameter in PL/SQL.

Button Procedures And Mouse Events

A button procedure is a PL/SQL procedure associated with an object or layer. It is executed when a specific mouse event occurs at run time. The mouse down event determines which object becomes "event active." The event-active object receives the mouse down event, and every subsequent event until the next mouse down event (which determines a new event-active object). Only an object that has a PL/SQL procedure associated with it and is set to receive at least one mouse event is eligible to become the event-active object. An object does not have to be set to receive a mouse down event in order to become event-active.

A button procedure has four arguments that it is provided. The arguments include a buttonobj (button object), hitobj (hit object), win (window), and eventinfo (event information). The buttonobj is a handle (or pointer) to an event-active object. The hitobj is a handle to the topmost object underneath the buttonobj that the mouse is pointing to when the event is detected. The hitobj differs from the buttonobj when the object that was clicked on is a child of a group that has a button procedure. For this case, the buttonobj is the group object and the hitobj is the child. The win is the handle to the window in which the event-active object became event-active. The eventinfo contains information about the mouse event that invoked this procedure. It can be implemented as a record. In the preferred embodiment, this field is implemented as a built-in datatype OG_EVENT.

The eventinfo argument of a button procedure contains information about the mouse event that invoked the procedure. The eventinfo is illustrated in FIG. 5. The eventinfo argument 510 includes an event_type field 510A, mouse_position field 510B, click_count field 510C, and constrained field 510D. The event_type field 510A is the type of mouse event that was received by the button procedure. The value of this field is a constant numeric value indicating a received mouse down, mouse move down, mouse up, or mouse move up event. The mouse_position field 510B is the X- and Y-coordinates of the position of the mouse on the layout at the time the event was received. The click_count field 510C is the number of mouse clicks that were detected, only if the event was mouse down. When a double-click is detected, the procedure also receives all of the events that compose the double click. The events of the double click are a mouse down event with a click count of 1, followed by a mouse up event, then a mouse down with a click count of 2, and finally another mouse up. The constrained field 510D specifies whether the shift key is down. The boolean value of the constrained field is either true or false for constrain key down or constrain key is not down, respectively.

The eventinfo field of a button procedure is used by the procedure to perform different actions on different events. A button procedure is invoked by any event that it is set to receive. When no conditions are placed on the actions of the procedure, all PL/SQL statements not limited to a specific condition are executed in the procedure.

When the present invention detects a mouse down event, it provides a technique for locating the first object that has a procedure associated with it and is set to receive at least one mouse event. Processing begins by locating the topmost object on the active layer pointed to by the mouse. A check is made to determine if the topmost object has a procedure associated with it and is set to receive at least one mouse event. When the check returns true, the object is set to be the event-active or active button object (ABO). When the check returns false, another check is made to similarly determine if the parent group of the topmost object meets the condition. When the check returns true, the parent group is set to be the ABO. When the second check returns false, the parent's parent, and so on up the tree, of the topmost object is checked to determine if the parent's parent has a procedure associated with it and is set to receive at least one mouse event. When the check returns true, the parent's parent is set to be the ABO. When the check returns false, the active layer is checked to determine if the active layer has a procedure associated with it and is set to receive at least one mouse event. When the check returns true, the active layer is set to be the ABO.

Using the above selection method, the first object found that has a procedure associated with it and is set to receive at least one mouse event becomes the active button object. When no qualifying object is found, the mouse down event is ignored. The active layer is made event-active by clicking on part of the layout that is not occupied by an object residing on that layer.

When the ABO has been selected, as described above, the present invention checks to determine if the object is set to receive mouse down events. When the check returns true, the object receives the mouse down event that made it active, and the procedure is executed. The present invention then does the same for all subsequently detected events. It invokes the procedure only for the events that the object is set to receive. When the present invention detects a mouse up event, the ABO is deactivated. The object no longer receives any mouse events, unless and until it is made event-active by a mouse down event.

A layer can receive one event that an object that an object cannot. It is able to receive a mouse move up event. When the active layer has a procedure associated with it and is set to receive the mouse move up event, it does so as long as no other event is event-active.

Flow Diagrams of the Present Invention

Figure 6:
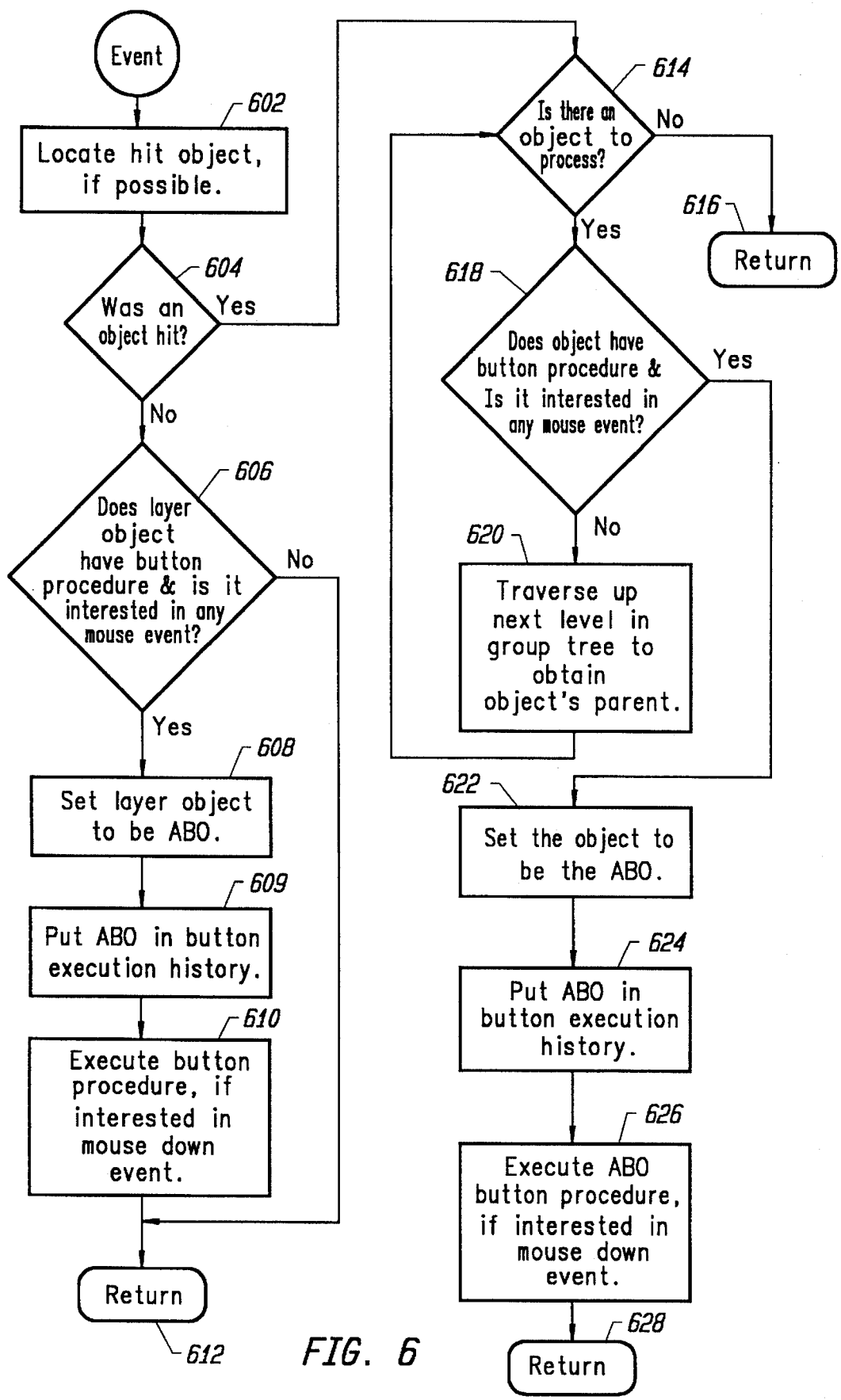
FIG. 6 is a flow diagram illustrating the processing of a mouse down event according to the present invention.
Figure 7:
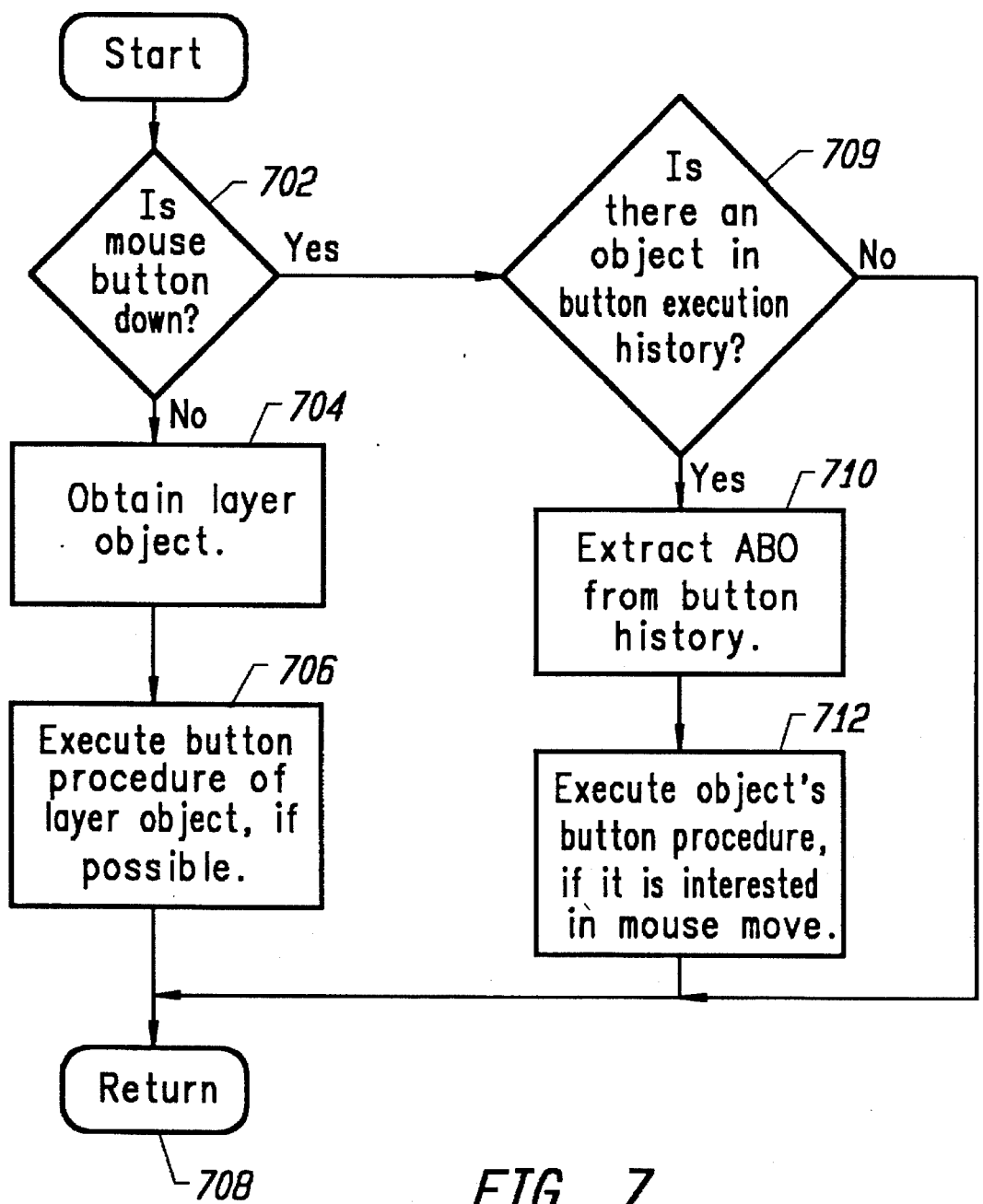
FIG. 7 is a flow diagram illustrating the processing of a mouse move event according to the present invention.
Figure 8:
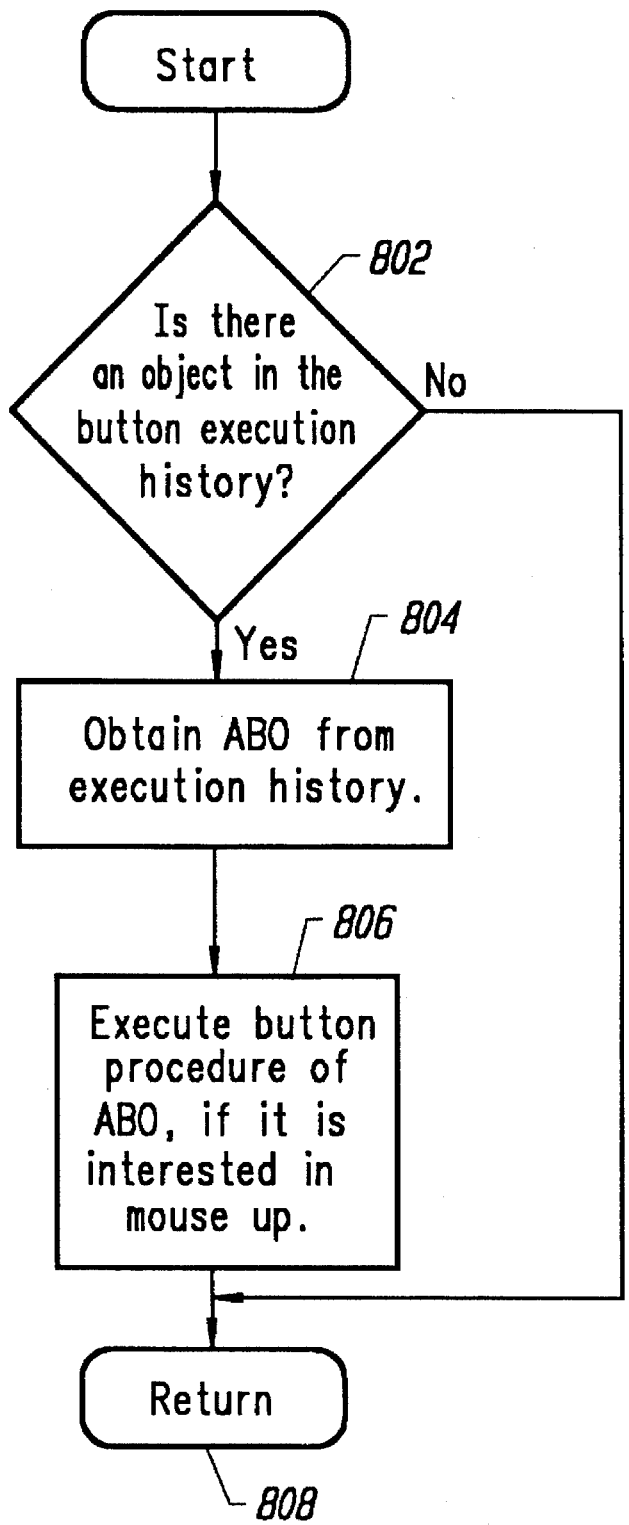
FIG. 8 is a flow diagram illustrating the processing of a mouse up event according to the present invention.
Figure 9:
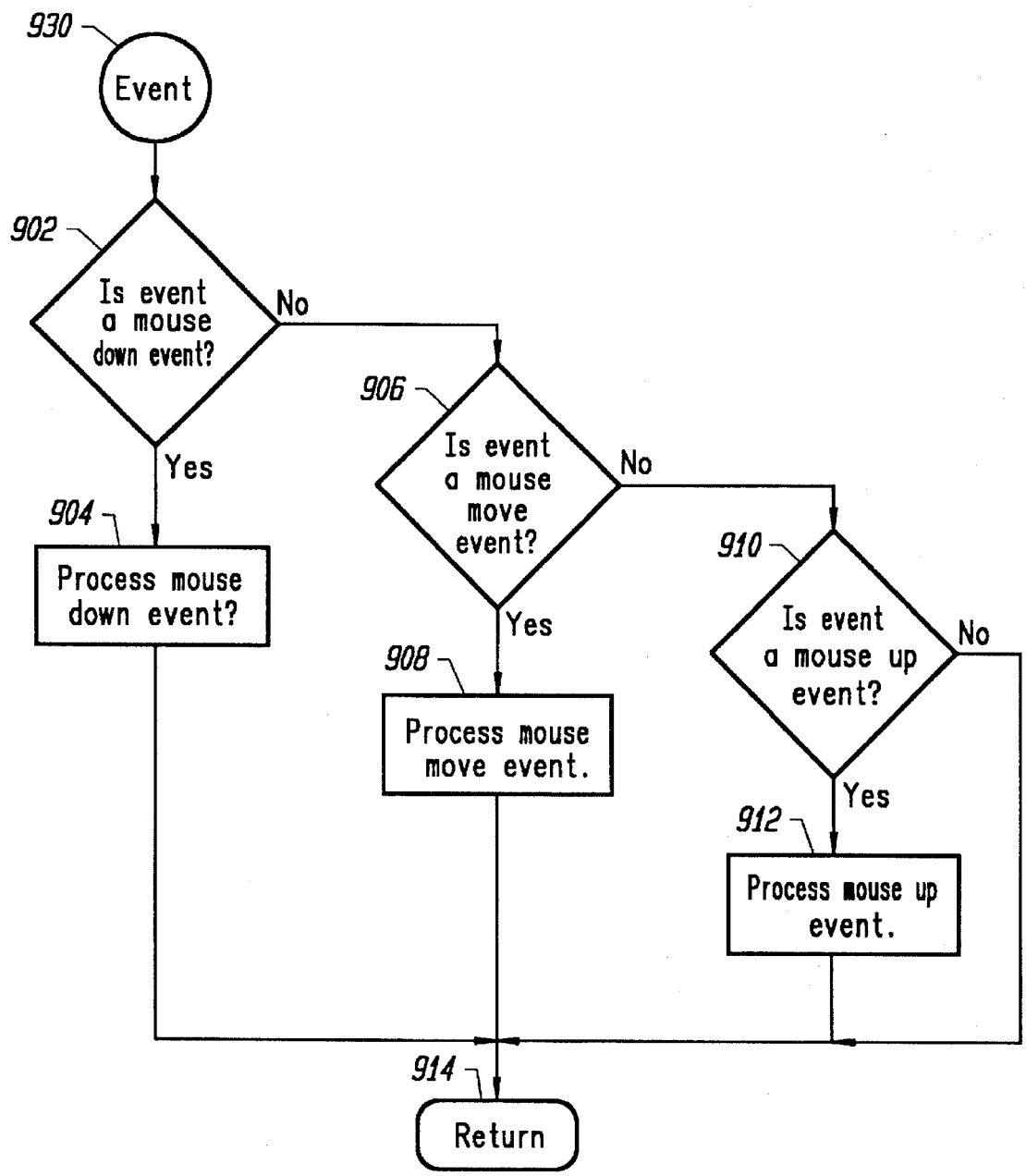
FIG. 9 is a flow diagram illustrating the processing of a mouse event according to present invention.

FIGS. 6–9 are flow diagrams illustrating the present invention for processing button procedures of objects. In FIG. 9, an event 930 is checked in decision block 902 to determine if it is a mouse down event. When decision 902 returns true (yes), execution continues at step 904. In step 904, the mouse down event is processed. FIG. 6 is a flow diagram illustrating step 904 of FIG. 9. Execution continues at step 914 where processing returns to the calling procedure. When decision block 902 returns false (no), execution continues at decision block 906. In decision block 906, a check is made to determine if the event is a mouse move event. When decision block 906 returns true (yes), execution continues at step 908. In step 908, the mouse move event is processed. FIG. 7 is a flow diagram illustrating step 908. Execution continues at step 914 where the process returns to the calling process. When decision block 906 returns false (no), execution continues at decision block 910. In decision 910, a check is made to determine if the event is a mouse up event. When decision block 910 returns true (yes), execution continues at step 912. In step 912, the mouse up event is processed. FIG. 8 is a flow diagram illustrating step 912 of FIG. 9. Execution continues at step 914. In step 914, execution returns to the calling process. When decision block 910 returns false (no), execution continues at step 914.

In FIG. 6, execution begins in step 602. In step 602 the object that was hit is located, if possible. This is done by obtaining the mouse position from the event record, and translating it to virtual space. The virtual space coordinates are used to determine the hit object using methods well-known in the art. In decision block 604 a check is made to determine if the object was hit. When decision block 604 returns false (no), execution continues at decision block 606. In decision block 606, a check is made to determine if the layer object has a button procedure and if it is interested in any mouse event. When decision block 606 returns true (yes), execution continues at step 608. In step 608, the layer object is set to be the active button object (ABO). In step 609, the ABO is put in the button execution history. In step 610 the button procedure of the ABO is executed if it is interested in a mouse down event. In step 612, the process returns to the calling process. When decision block 606 returns false (no), execution continues at step 612.

When decision block 604 returns true (yes), execution continues at decision block 614. In decision block 614, a check is made to determine if there is an object to process. When decision block 614 returns false (no), execution continues at step 616. In step 616, the process returns to the calling process. When decision block 614 returns true (yes), execution continues at decision block 618. In decision block 618, a check is made to determine if the object has a button procedure and if it is interested in any mouse event. When decision block 618 returns false (no), execution continues at step 620. In step 620, the group tree is traversed upwardly to the next level to obtain the object's parent. Execution then continues at decision block 614.

When decision block 618 returns true (yes), execution continues at step 622. In step 622, the object is set to be the ABO. In step 624, the ABO is put in the button execution history. A button execution history is simply a linked list, or similar data structure, containing a record of executed button procedures. In step 626, the ABO button procedure is executed if it is interested in a mouse-down event. The process returns to the calling process in step 628.

FIG. 7 is a flow diagram illustrating the process for handling a mouse move event. In decision block 702, a check is made to determine if the mouse button is down. When decision block 702 returns false (no), execution continues a step 704. In step 704, the layer object is obtained. In step 706, the button procedure of the layer object is executed if possible. In order for the button procedure the layer object to be executed, the layer object has a button procedure attached to it and the the layer object is interested in a mouse-move-with-no-mouse-down event. Execution continues at step 708 where the process returns to the calling process. When decision block 702 returns true (yes), execution continues at decision block 709. In decision block 709, a check is made to determine if there is an object in the button execution history. When decision block returns false (no), execution continues at step 709. When decision block 709 returns true (yes), execution continues at step 710. In step 710, the ABO is extracted from the button execution history. In step 712, the ABO's button procedure is executed, if it is interested in a mouse move event. Execution continues at step 708.

FIG. 8 is a flow diagram illustrating the process of handling a mouse up event according to step 912 of FIG. 9. In decision block 802, a check is made to determine if there is an object in the button execution history. When decision block 802 returns true (yes), execution continues at step 804. In step 804, the ABO is obtained from the button execution history. In step 806, the button procedure of the ABO is executed if it is interest in a mouse up event. Execution continues at step 808 where the process returns to the calling process. When decision block 802 returns false (no), execution continues at step 808.

Exemplary Usage of the Present Invention

Figure 10:
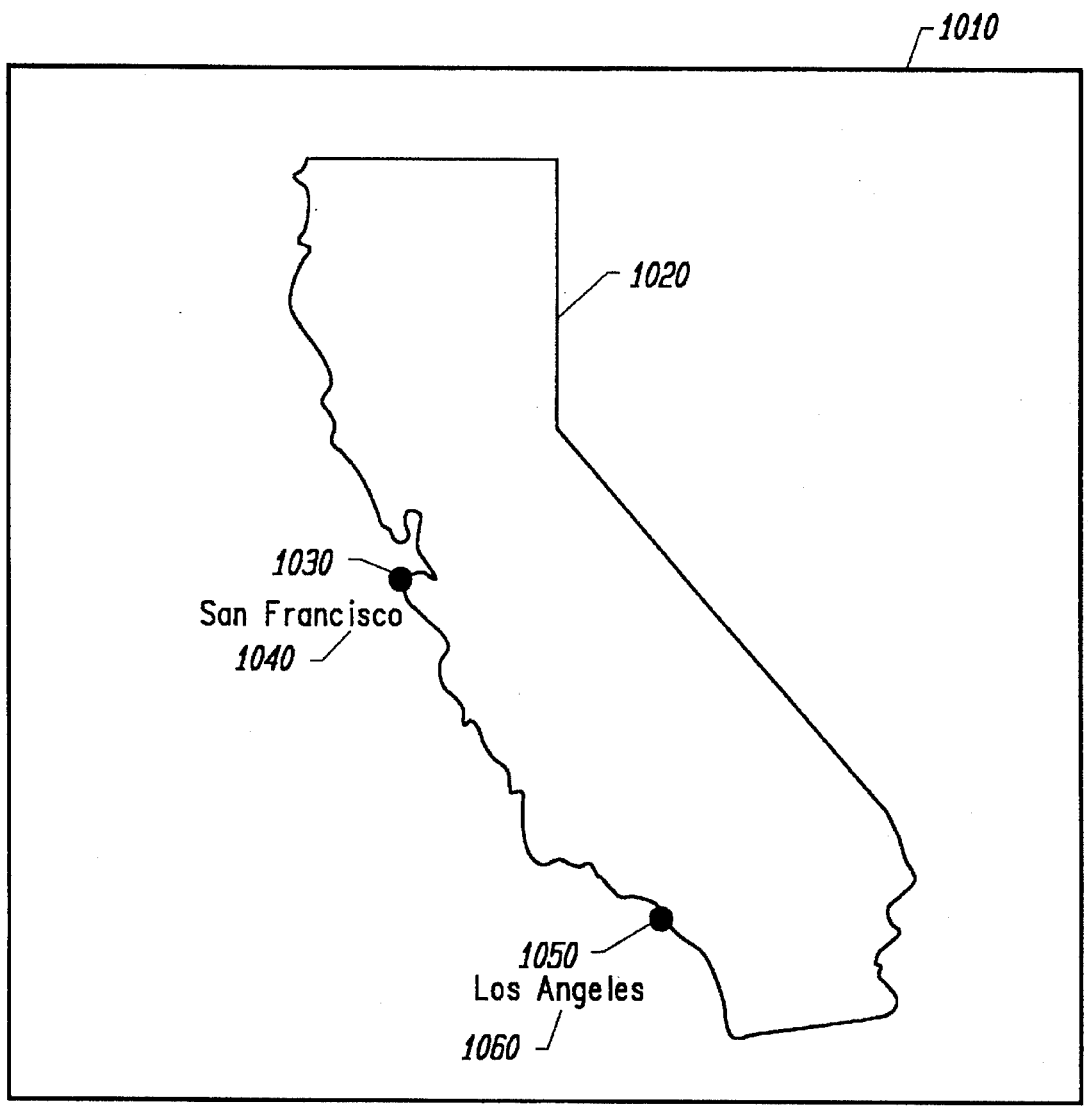
FIG. 10 is a diagram illustrating a display containing objects according to the present invention; and, FIG. 11 is a diagram illustrating the display after hitting an object, and executing a PL/SQL procedure according to the present invention.

FIG. 10 is a display containing at least one layer and several graphic objects according to the present invention. Layer 1010 contains an object 1020 that is an image of the state of California. It may be either a freehand or bitmap image. The layer 1010 also contains circle objects 1030 and 1050 indicating the cities of San Francisco and Los Angeles, respectively. In display 1010, text "San Francisco" 1040 and "Los Angeles" 1060 are located in proximity to circle object 1030 and 1050, respectively. Each object 1020–1060 is represented by an object handler, and has associated attribute records indicated in Table 1. The display of FIG. 10 uses button triggers to navigate graphically through data.

Figure 11:
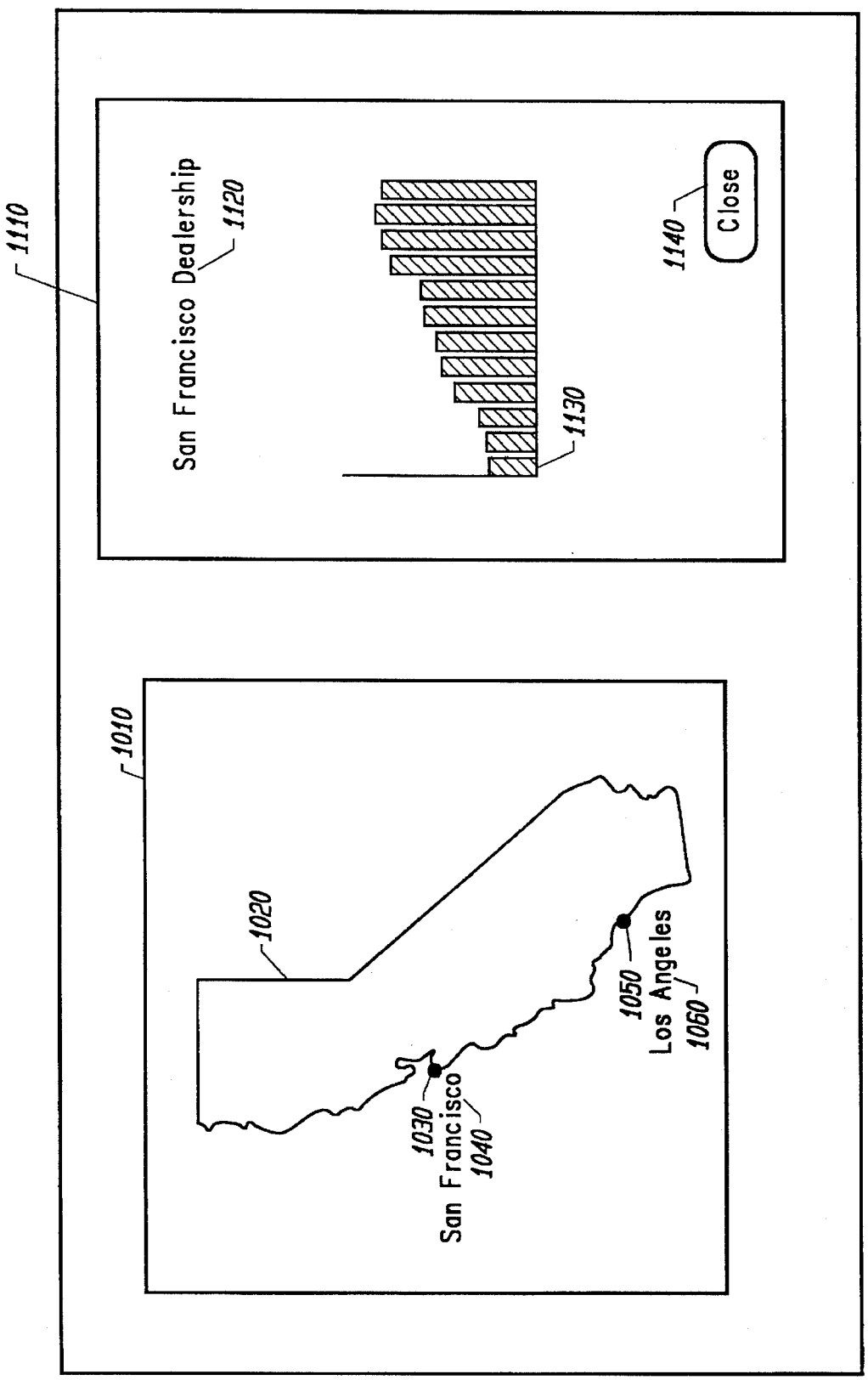

FIG. 10 displays an object 1020 representing the map of California in layer 1010. It contains objects 1030 and 1050 that are button objects for the cities of San Francisco and Los Angeles, respectively. For example, an auto dealership has operations in both cities. When city objects 1030 and 1050 are clicked upon, a new window illustrated in FIG. 11 is opened containing a chart showing the forecast and actual sales over the past calendar year for the particular dealership. This information is obtained and displayed using PL/SQL procedures. The new window also has a "Close" button 1140 that destroys the window when clicked upon using the mouse.

Tables 4 and 5 illustrate PL/SQL procedures for showing and closing a chart in response to mouse events, respectively. Table 4 illustrates a PL/SQL procedure that is responsive to a mouse down event for objects 1030 and 1050 of FIG. 10. For instance, when a user points a mouse at the San Francisco city object 1030 and depresses a mouse button, a mouse down event is processed using the method of FIGS. 6–9.

TABLE 4

```
procedure showchart (buttonobj in og_object, hitobj in og_object,
                    win in og_window, eventinfo in og_event) is
attr og_arc_ca;           /*attributes of city button*/
nwin og_window;           /*handle to new SF or LA window*/
wattr og_window_attr;     /*attributes of new SF or LA
                            window*/
begin
/*get the name of the button object that was click upon*/
attr.arc_caob.mask := og_NAME_GENERICA;
og_get_attr(buttonobj, attr);
/*set up the attributes for the new window*/
wattr.mask := og_SIZE_WINDOWA +
og_NAME_WINDOWA;
```

TABLE 4-continued

```
wattr.width := 450;
wattr.height := 650;
if ( attr.arc_caob.name = 'SF') then
    /* make the new SF window*/
    wattr.name := 'San Francisco Dealership';
    nwin := og_make(wattr);
    /*activate the object layer containing the SF chart*/
    og_activate_layer( og_get_layer('SF_layer'), nwin );
    og_hide_layer( og_get_layer('LA layer'), nwin );
elseif ( attr.arc_caob.name = 'LA') then
    /* make the new LA window*/
    wattr.name := 'Los Angeles Dealership';
    nwin := og_make(wattr);
    /*activate the object layer containing the LA chart*/
    og_activate_layer( og_get_layer('LA_layer'), nwin );
    og_hide_layer( og_get_layer('SF layer'), nwin );
endif;
/*hide the layer containing the state of CA*/
og_hide_layer( og_get_layer('CA_layer'), nwin);
end;
```

Referring to FIG. 9, a mouse event record 930 illustrated in FIG. 5 is generated. The event_type 510A of mouse event record 930 indicates that it is a mouse down event. In decision block 902, the event 930 is determined to be a mouse down event by checking this field, and returns true. In step 904, the mouse down event is processed. Referring to FIG. 6, the hit object, in this case object 1030, is located in step 602. Decision block 604 checks to determine if an object was hit, and returns true. Execution continues at decision block 614. In decision block 614, a check is made to determine if there is an object to process, and returns true due to object 1030. In decision block 618, the object 1030 is determined to have a button procedure (illustrated in Table 4) and it is interested in any mouse event. Since decision block 618 returns true, execution continues at step 622. In step 622, object 1030 is set to be the active button object. In step 624, the object 1030 is put in the button execution history. In step 626, the ABO button procedure (in this case, the procedure showchart of Table 4) is executed. Processing returns in step 628.

As mentioned above, PL/SQL procedure showchart of Table 4 is executed in step 626. When it is called, it is passed the buttonobj and the hitobj that both point to object 1030 in this case. The PL/SQL procedure gets the name of the button object 1030 that was clicked upon. As mentioned above, this is an optional parameter. It then sets up the attributes of a new window passed to the procedure as win. The button procedure makes the new San Francisco window, and activates the object layer containing the San Francisco chart. Finally, it hides the layer containing the object 1020 representing the state of California. This procedure operates similarly in response to a mouse down event for the Los Angeles city object 1050. Thus, the PL/SQL procedure showchart can be attached to both the Los Angeles and San Francisco city objects 1050 and 1030, respectively. FIG. 11 is a diagram illustrating the display after execution of the showchart procedure in step 626 above.

FIG. 11 is a diagram illustrating the display after execution of PL/SQL procedure showchart of Table 4. As described above, the display contains the layers and objects of FIG. 10, and further includes the chart for San Francisco dealerships. FIG. 11 contains "San Francisco Dealership" text 1120, chart 1130, and object 1140 representing a close button.

When the user clicks on the "Close" object 1140 of FIG. 11, the present invention processes the mouse down event as described above with reference to object 1030. In step 626 of FIG. 6, the PL/SQL procedure closeme is executed. Table 5 illustrates the procedure closeme associated with the "Close" button object 1140.

TABLE 5

```
procedure closeme (buttonobj in og_object, hitobj in og_object,
                   win in og_window, eventinfo in og_event) is
begin
    /*destroy the clicked upon window*/
    og_destroy(win);
end;
```

The procedure of Table 5 receives the window (win) parameter, and closes the window containing the chart. It uses the "win" parameter to work with both Los Angeles and San Francisco windows.

The foregoing has served to describe how the present invention manipulates database and graphic objects in a database system. It requires minimal programming. It will be evident to those skilled in the art that a great many variants of functionality are equally applicable and, therefore, is considered within the scope of the present invention.

Thus, a method for manipulating graphic objects has been provided.

We claim:

1. A method for manipulating database and graphic objects in a database system, comprising the steps of:

providing a plurality of graphic objects, said plurality of graphic objects stored in a tree;

displaying said plurality of graphic objects;

generating a mouse event by pointing a mouse at one of said plurality of graphic objects and clicking a mouse button;

traversing said tree to locate an active object having a first button procedure that is responsive to a mouse event, said traversing beginning with said one of said plurality of graphic objects;

executing said first button procedure of said active object when said active object is found; and, wherein said first button procedure includes one or more PL/SQL statements.

2. A method for manipulating database and graphic objects in a database system, comprising the steps of:

providing a plurality of graphic objects, said plurality of graphic objects stored in a tree;

displaying said plurality of graphic objects;

generating a mouse event by pointing a mouse at one of said plurality of graphic objects and clicking a mouse button;

traversing said tree to locate an active object having a first button procedure that is responsive to a mouse event, said traversing beginning with said one of said plurality of graphic objects;

executing said first button procedure of said active object when said active object is found;

obtaining a layer object when said mouse points at said layer object and said mouse button is clicked; and, executing a second button procedure of said layer object when said layer object has a second button procedure, wherein said second button procedure includes one or more PL/SQL statements and said second button procedure is interested in a mouse down event.

3. A method for manipulating database and graphic objects in a database system, comprising the steps of:

providing a plurality of graphic objects, said plurality of graphic objects stored in a tree;

displaying said plurality of graphic objects;

generating a mouse event by pointing a mouse at one of said plurality of graphic objects and clicking a mouse button;

traversing said tree to locate an active object having a first button procedure that is responsive to a mouse event, said traversing beginning with said one of said plurality of graphic objects;

executing said first button procedure of said active object when said active object is found; and, putting said active object in a button execution history.

4. A method for manipulating database and graphic objects in a database system, comprising the steps of:

providing plurality of graphic objects, said plurality of graphic objects stored in a tree:

displaying said plurality of graphic objects;

generating a mouse event by moving a mouse;

checking said mouse event to determine if a button of said mouse is depressed; and, when said mouse button is depressed, extracting an active object from a button execution history and executing a first button procedure of said active object when said first button procedure is responsive to a mouse move event, wherein said first button procedure includes one or more PL/SQL statements.

5. A method for manipulating database and graphic objects in a database system, comprising the steps of:

providing a plurality of graphic objects, said plurality of graphic objects stored in a tree;

displaying said plurality of graphic objects;

generating a mouse event by moving a mouse;

checking said mouse event to determine if a button of said mouse is depressed;

when said mouse button is depressed, extracting an active object from a button execution history and executing a first button procedure of said active object when said first button procedure is responsive to a mouse move event;

checking a layer object when said mouse button is not down;

executing a second button procedure of said layer object when said layer object has a second button procedure and said second button procedure is interested in a mouse move event; and, wherein said second button procedure includes one or more PL/SQL statements.

6. A method for manipulating database and graphic objects in a database system, comprising the steps of:

generating a mouse up event by releasing a mouse button;

checking a button execution history to determine if said button execution history contains at least one graphic object; and, when said button execution history contains at lease one graphic object, extracting an active button from said execution history and executing a button procedure of said active button when said button procedure is responsive to a mouse up event.

7. The method of claim 6 wherein said first button procedure includes one or more PL/SQL statements.

8. A method for manipulating a plurality of graphic objects, comprising the steps of:

selecting a first graphic object in the plurality of graphic objects;

providing a first button procedure associated with the first graphic object;

entering the first button procedure;

executing a computer program statement;

executing a PL/SQL computer program statement causing a database to be accessed; and exiting the first button procedure.

9. The method of claim 8, wherein the selecting step includes the step of generating a mouse event.

10. A method for manipulating a database and graphic objects in a database system, comprising the steps of:

providing a plurality of graphic objects, said plurality of graphic objects stored in a tree;

displaying said plurality of graphic objects;

generating a mouse event by pointing a mouse at one of said plurality of graphic objects and clicking a mouse button;

traversing said tree to locate an active object having a first button procedure that is responsive to a mouse event, said traversing beginning with said one of said plurality of graphic objects; and, executing said first button procedure of said active object when said active object is found, wherein the executing step includes executing 1) a computer program statement and 2) a PL/SQL statement for accessing the database.

11. A method for manipulating graphic objects on a display, comprising the steps of:

executing a first button procedure for providing a plurality of graphic objects;

selecting a first graphic object in the plurality of graphic objects by pointing a mouse at a first graphic object;

attaching a second button procedure to the first button procedure responsive to the selection step;

executing the second button procedure; and, wherein the steps are completed during run-time.

12. A method for manipulating graphic objects on a display, comprising the steps of:

executing a first button procedure for providing a plurality of graphic objects;

selecting a first graphic object in the plurality of graphic objects by pointing a mouse at a first graphic object;

attaching a second button procedure to the first button procedure responsive to the selection step;

executing the second button procedure; and, wherein the executing a first button procedure step includes the step of providing a first graphic object which is not responsive to a mouse event and wherein the executing of the second button procedure step enables the first graphic object to be responsive to a mouse event.

* * * * *

UNITED STATES PATENT AND TRADEMARK OFFICE
CERTIFICATE OF CORRECTION

PATENT NO.   : 5,627,959
DATED        : May 6, 1997
INVENTOR(S)  : Bruce Brown et al.

It is certified that error appears in the above-indentified patent and that said Letters Patent is hereby corrected as shown below:

Column 7, line 31, please delete "image" and insert in its place -- group --.

Signed and Sealed this

Twenty-second Day of July, 1997

Attest:

BRUCE LEHMAN

*Attesting Officer*                    *Commissioner of Patents and Trademarks*